(No Model.)
J. W. HOLLIDAY.
SULKY.
No. 492,725. Patented Feb. 28, 1893.
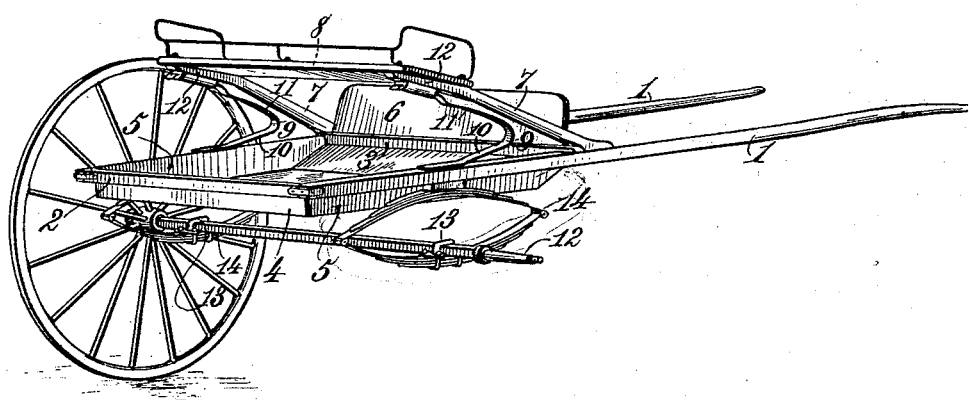
Witnesses.
Inventor:
John W. Holliday.
By
Atty.

United States Patent Office.

JOHN W. HOLLIDAY, OF PARIS, KENTUCKY.

SULKY.

SPECIFICATION forming part of Letters Patent No. 492,725, dated February 28, 1893.

Application filed October 5, 1892. Serial No. 447,880. (No model.)

*To all whom it may concern:*

Be it known that I, JOHN W. HOLLIDAY, a citizen of the United States, residing at Paris, in the county of Bourbon and State of Kentucky, have invented new and useful Improvements in Break-Carts, of which the following is a specification.

My invention relates to two-wheeled carts or sulkies, and particularly to that class of vehicles known as break-carts, and said invention has for its object to provide an improved seat-spring of such construction and location that it will effectually prevent the usual jarring occasioned by the motion of vehicles from being communicated to the person driving, and also to provide a novel manner of attaching and locating the vehicle springs, whereby the usual jarring of the vehicle is prevented from being communicated to the horse. And finally my invention has for its object to improve generally the construction of such vehicles.

To such ends my invention consists in the novel construction, location, combination and arrangement of parts hereinafter described and claimed, reference being made to the accompanying drawing, in which—the figure is a perspective view of a vehicle with my invention applied thereto, one of the wheels of the vehicle being removed.

In the said drawing the reference numeral 1 designates the shafts of the vehicle which are connected together at their rear ends by a cross-bar 2, and at a suitable distance from their rear ends by a cross-bar 3. Bolted or secured in any suitable manner to the shafts 1 and the cross-bars 2 and 3 is a drop bottom 4, having vertical sides 5, whereby a receptacle adapted to receive various articles, such as baggage, marketing, &c. is formed. A dash-board 6 extends upwardly and forwardly from the cross-bar 3. At a suitable distance from the rear ends of the shafts 1, preferably in proximity to the cross-bar 3, I secure seat bars or supports 7, which extend upwardly and rearwardly from said shafts and supported upon and secured to the upper ends of said bars or supports is a seat 8.

The numerals 9 represent springs for yieldingly or springily supporting the seat 8. Each spring 9 is bent intermediate its ends to form two spring arms 10 and 11, one of which arms 10, is substantially straight and when in position is substantially horizontal and the other of which arms 11, extends upwardly and rearwardly therefrom. The free end of the lower or horizontal arm of each spring is secured to one of the shafts 1, and extends forwardly above the shaft a suitable distance to the point where the spring is bent, from which point the arm 11 extends upwardly and rearwardly substantially parallel with the seat bars 7 and is secured at its free end to the under side of a rearward projection 12 on one of the seat bars, the said spring, shaft and seat bar being in vertical alignment with each other. The construction and location of the springs directly between the under sides of the seat bars 7 and the upper sides of the shafts as described render the seat of the vehicle efficient spring support and prevents the jarring so common in vehicles of the class to which my invention relates.

In many instances the jarring and jerking occasioned in vehicles of the kind named, is communicated through the running gear and shafts to the horse, irritating and rendering him uncomfortable. In order to obviate these objections, I construct and arrange the running gear in the following manner.

The axle 12 on the outer ends of which the vehicle wheels turn I attach, by means of clips 13, of suitable construction, to the lower halves of elliptical springs 14, the upper halves of which are secured by bolts or other suitable devices, directly to the shafts 1. In this manner the jolting or jarring of the vehicle is counteracted by the springs 15, and by reason of said springs being secured directly to the shafts, the jolting is prevented from being communicated to the horse. It will thus be seen that I provide a cart adapted for breaking a horse which is of very simple construction which will run easily and free from jolting or jarring.

Having thus described my invention, what I claim is—

1. A break cart, consisting of a wheeled axle having attached springs to the upper sides of which the shafts are rigidly secured, the inclined seat carrying bars having their forward ends secured to the shafts, and a spring bent intermediate its extremities to form two arms 10 and 11 and interposed between each seat bar and a shaft, one arm of each spring being secured directly to the under side of a seat bar and the other arm secured directly to the upper side of a shaft, substantially as described.

2. A break cart, consisting of a wheeled axle having attached elliptic springs to the upper sides of which the shafts are rigidly secured, a pair of inclined seat arms secured at their forward ends to the shafts, and a pair of springs each bent intermediate its extremities to form two arms 10 and 11 one of which is secured to the rear end of a seat arm and the other secured to a shaft, substantially as described.

In testimony whereof I have hereunto set my hand and affixed my seal in presence of two subscribing witnesses.

JOHN W. HOLLIDAY. [L. S.]

Witnesses:
    JNO. J. MCCLINTOCH,
    HENRY SPEARS.